United States Patent [19]

Kiesow

[11] Patent Number: 4,612,114

[45] Date of Patent: Sep. 16, 1986

[54] METHOD AND APPARATUS FOR SEPARATING DIFFERENT CONSTITUENTS

[75] Inventor: Carl Kiesow, Norderstedt, Fed. Rep. of Germany

[73] Assignee: Carl Kiesow Rohstoffrückewinnung, Fed. Rep. of Germany

[21] Appl. No.: 755,549

[22] Filed: Jul. 16, 1985

Related U.S. Application Data

[63] Continuation of Ser. No. 574,294, Jan. 26, 1984, abandoned.

[30] Foreign Application Priority Data

Jan. 26, 1983 [DE] Fed. Rep. of Germany ....... 3302490

[51] Int. Cl.$^4$ .............................................. B03D 5/28
[52] U.S. Cl. .................................................... 209/172
[58] Field of Search ................... 209/172, 173, 172.5, 209/155, 168, 169; 210/513

[56] References Cited

U.S. PATENT DOCUMENTS

| 763,662 | 6/1904 | Delprat | 209/168 |
| 3,249,226 | 5/1966 | Watson | 209/172.5 |
| 4,026,477 | 5/1977 | Tremolada | 209/172.5 |
| 4,230,561 | 10/1980 | McMurray | 209/173 |
| 4,409,098 | 10/1983 | Burke | 209/172.5 |

FOREIGN PATENT DOCUMENTS

| 239632 | 1/1960 | Australia | 209/172.5 |
| 517515 | 2/1953 | Belgium | 209/173 |
| 29117 | 12/1921 | Denmark | 209/173 |
| 547648 | 12/1922 | France | 209/173 |
| 70132 | 1/1952 | Netherlands | 209/172.5 |
| 974120 | 11/1964 | United Kingdom | 209/172.5 |

Primary Examiner—Bernard Nozick
Attorney, Agent, or Firm—Hill, Van Santen, Steadman & Simpson

[57] ABSTRACT

A method and apparatus for separating discrete solid fractions from dispersion in a dense liquid medium wherein the suspended materials are subjected to settling to produce a low density fraction floating on the surface, a middlings fraction suspended in the liquid medium, and a high density fraction which sinks to the bottom. The high density fraction is lifted off in a region of the dense medium in which the surface level of the dense medium is substantially free from particles of the floating low density fraction.

2 Claims, 4 Drawing Figures

METHOD AND APPARATUS FOR SEPARATING DIFFERENT CONSTITUENTS

This is a continuation, of application Ser. No. 574,294, filed Jan. 26, 1984 now abandoned.

BACKGROUND OF THE INVENTION

1. Field of the Invention

The present invention relates to an apparatus for separating different constituents of a multifraction product by means of a dense liquid medium. As a result of settling due to differences in specific gravity, a light fraction floats on the dense medium, middlings fraction remains suspended in the dense medium, and a higher density fraction sinks to the bottom of the medium. The invention is particularly concerned with the removal of the dense fraction from the liquid medium without contamination by the other fractions.

2. Description of the Prior Art

The separation of different constituents by means of settling in a dense liquid is known in various embodiments in the prior art. In particular, the application of such methods is widespread in mining for processing coal and ore. The method has also been recently applied for recycling various materials such as metals. The recycling of valuable metals from scrap, particularly from automotive scrap, is a preferred field of application for this type of method.

In a conventional method of this sort, the product is normally delivered onto the dense liquid medium, a floating fraction is extracted from the dense medium and the heavy fraction sinks to the bottom under the force of gravity. Since the dense fraction sinks essentially perpendicularly, the removal of the heavy fraction must essentially begin in those regions of the dense liquid medium in which the floating light fraction covers the surface of the medium. With conventional withdrawal, therefore, a certain portion of suspended product (middlings) and the low density floating product is necessarily withdrawn together with the heavier fraction. Thus, the separated heavy fraction is contaminated with constituents of the suspended product and of the lower density floating material so that an insufficient separation is achieved.

SUMMARY OF THE INVENTION

The present invention provides a method and apparatus for separating discrete solid fractions from a feed material to produce a high degree of separation. In accordance with the present invention, the lifting off of the high density fraction is carried out in a region of the dense liquid medium in which the surface level of the medium is essentially free of floating low density material. This leads to a relatively high separation efficiency in a relatively simple manner. It is also preferable that the lifting off of the high density material be carried in a region of the dense liquid medium in which the medium is also essentially free of middlings which leads to a still further improvement of the separation effect.

It is desirable for properly carrying out the present invention that the separation of the different fractions proceed as quickly as possible after delivery of the product under the dense medium so that the formation of undesired beds of high density material is prevented. These demands are mutually contradictory to some extent because the eddies produced, for example, by agitator means used to prevent formation of settling beds do not promote a rapid separation of the constituents into fractions.

In one feature of the present invention, the dense liquid medium is induced to flow in such a manner that a laminar flow is produced in part of the liquid medium, and a turbulent flow is produced in another part. Preferably, the liquid medium is placed in turbulent flow in that region in which the surface level of the dense medium is free of floating, low density material and is placed in laminar flow in that region in which the surface level of the dense liquid medium is covered with such low density floating material.

The invention is also concerned with an apparatus for carrying out the method which includes essentially a dense medium receptacle and a lift-off means that is particularly suited for the implementation of the method. The apparatus avoids the disadvantages of the known dense medium separating apparatus first in that the dense medium receptacle is subdivided into at least one settling chamber and at least one lift-off chamber. It has been found that the separating process and the lift-off of the high density material need not coincide in the same region of the dense medium receptacle where the separation occurs. Thus, the dense medium separating apparatus provides an undisturbed carrying out of the separating process and an effective implementation of the lift-off process since turbulences caused in the dense medium due to the lift-off operation are definitely desirable in the lift-off chamber. Such turbulences contribute greatly to preventing excessive formation of undesired beds of material.

The dense medium separating apparatus can be exemplified in a variety of manners. One preferable form uses a settling chamber and a lift-off chamber which are connected to one another for purposes of fluid flow. The settling chamber floor is disposed higher than the lift-off chamber floor and the settling chamber floor is downwardly inclined in the direction toward the lift-off chamber. The heavy fraction striking the settling chamber floor is thus not deposited there but proceeds instead into the lift-off chamber under the force of gravity. In other words, the high density fraction necessarily slides from the settling chamber into the lift-off chamber.

The lift-off chamber can be arbitrarily disposed with respect to the settling chamber. In the form of the invention in which the dense medium is caused to flow in the settling chamber with a laminar flow, it is expedient to have the lift-off chamber exposed laterally with respect to the flow direction of the dense medium flowing through the settling chamber.

The division of the dense medium receptacle into a settling chamber and a lift-off chamber is preferably accomplished by means of a partition, which provides a gap to permit the heavier material to slide through from the settling chamber into the lift-off chamber, but nonetheless largely prevents middlings from penetrating into the lift-off chamber.

The design of the gap can take various forms. In one preferred form, the gap at least partially exhibits an increasing aperture dimension over its length. In addition, the gap can be designed to be wedge-like over its length. It can also be expedient to adjust the aperture dimensions of the gap according to the size of the product, as will be explained in greater detail in a succeeding portion of this specification.

The settling chamber floor and the lift-off chamber floor are preferably designed such that they merge into one another in the area of the partition and form a planar surface together, at least in the transition area. As previously explained, the settling chamber floor can be provided with an inclined surface toward the lift-off chamber.

The lift-off means in the lift-off chamber can consist, for example, of a rotary lift-off arm at whose outer end one or more scoops are attached. The scoop fills with the high density material in the floor region of the lift-off chamber and empties the high density material onto a chute or the like above the surface level of the dense medium for further conveying to other process stages. It is therefore expedient to design the floor of the lift-off chamber to be at least partially matched to the path of motion of the lift-off arm. A partially cylindrical design of the floor of the lift-off chamber can thus be provided which merges into an area proceeding essentially tangential to the path of motion of the lift-off arm at that side of the lift-off chamber facing the sinking chamber in order to form the planar surface referred to above.

The lift-off arm is disposed in the lift-off chamber such that the direction of the motion of the scoop proceeds at least partially opposite the direction of motion of the heavy fraction and, further, such that the pick-up of the heavier material by the scoop occurs at least partially above the lowest point of the lift-off chamber. It has also proven expedient to dispose the lift-off arm such that the shortest distance of the scoop to the floor in the lift-off chamber is determined by the measure of the particle size of the product. The particle size refers to an average size of the product and this can vary depending on the processing methods upstream of the separating process. It has been proven particularly practical in practice to adjust the shortest distance between the scoop and the floor of the lift-off chamber in the cylindrical area to correspond to about one-fourth of the particle size of the product. A distance corresponding about to the actual size of the product has been proven practical in the area of the partition.

Both the settling chamber and the lift-off chamber may be provided with at least one dense medium intake. In the settling chamber, the dense medium intake is disposed at a relatively slight distance below the surface level of the dense liquid medium, as this provides a particularly advantageous condition for the formation of laminar flow in the settling chamber. The dense medium flowing in the area of the surface level of the medium produces a velocity profile in accordance with the characteristics of a laminar flow, exhibiting its greatest value in the area of the surface level of the dense medium and then decreasing values just about linearly in the direction toward the floor of the settling chamber. In the lift-off chamber, by contrast, the dense medium intake is disposed in the area of the floor of the lift-off chamber so as to effectively prevent the formation of undesired beds of material.

BRIEF DESCRIPTION OF THE DRAWINGS

An embodiment of the invention will be explained in connection with the attached drawings, in which.

DESCRIPTION OF THE PREFERRED EMBODIMENTS

Figure 1:
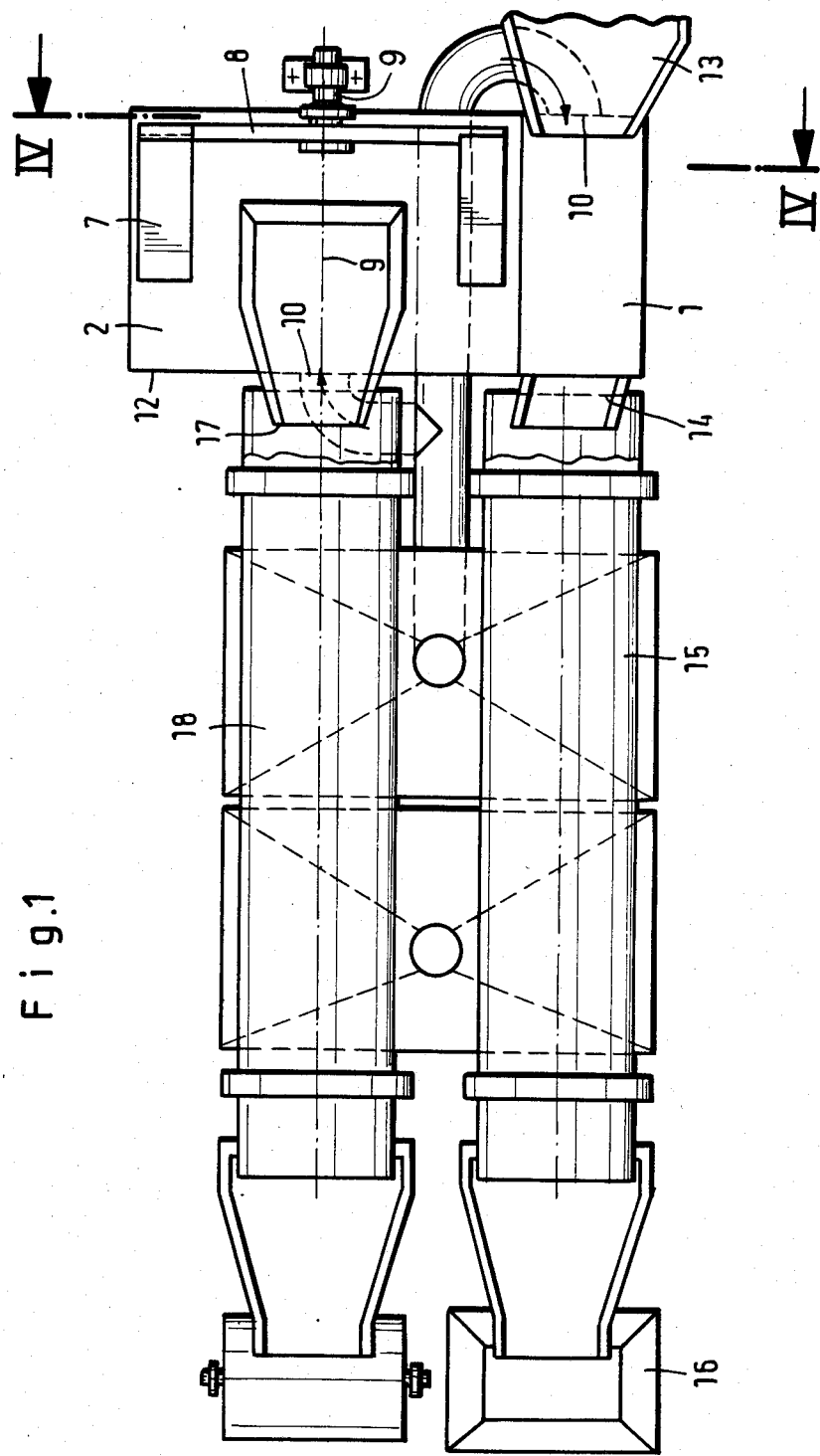
FIG. 1 is a plan view of a dense medium separating apparatus according to the present invention.
Figure 2:
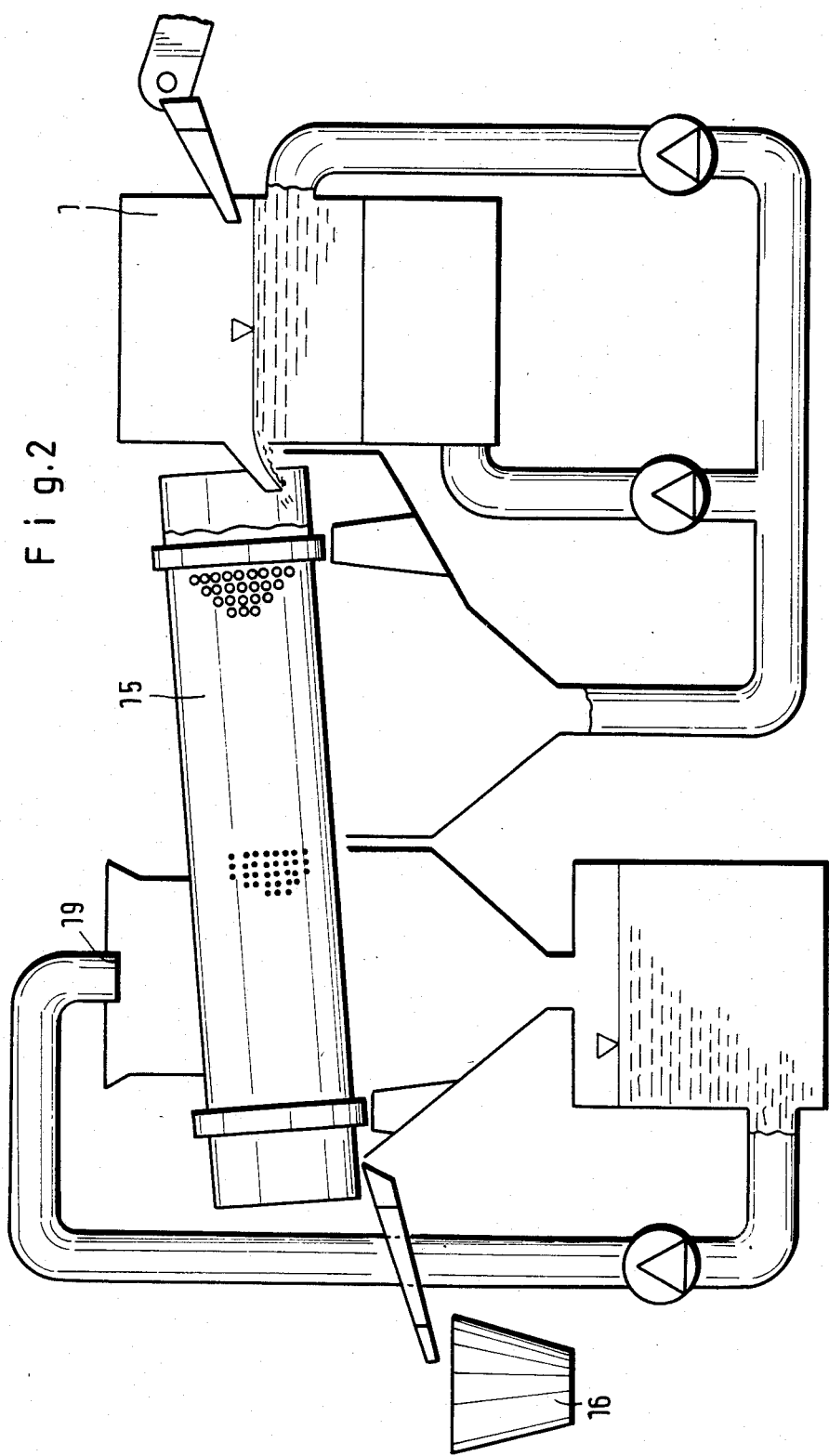
FIG. 2 is a cross-sectional view taken substantially along the line II—II of FIG. 4.
Figure 4:
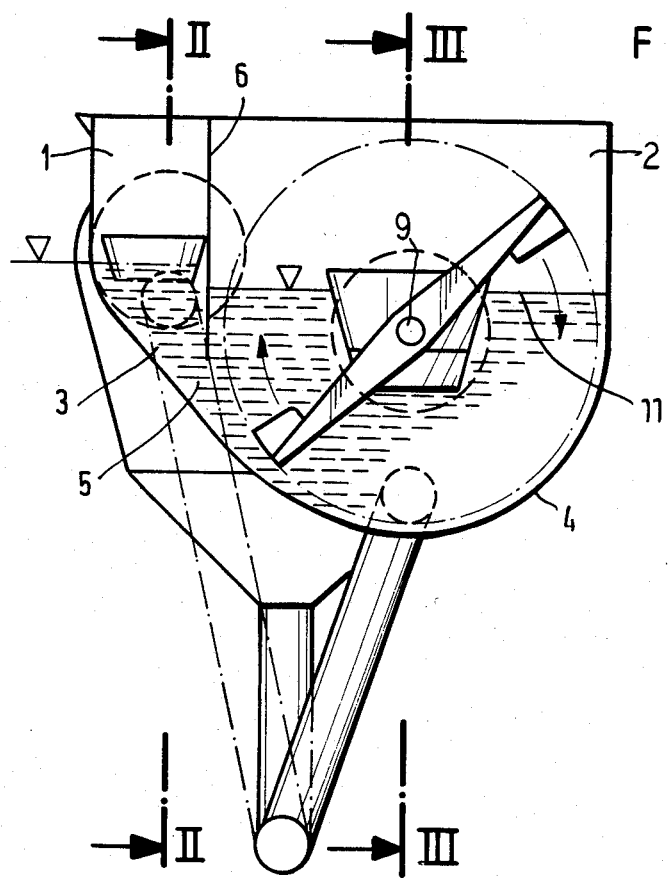
FIG. 4 is a cross-sectional view through the apparatus taken substantially along the line IV—IV in FIG. 1.

In FIG. 1, there is illustrated a dense medium separating apparatus comprising a dense medium receptacle 12 and a lift-off means 8. The dense medium separating apparatus is subdivided by a partition 6 into a settling chamber 1 and into a lift-off chamber 2 as illustrated in FIG. 4. The floor 3 of the settling chamber is provided with a sloping surface in the direction toward the lift-off chamber 2 and merges into a floor 4 of the lift-off chamber 2 in the area of the partition 6. The transition between the floor 3 of the settling chamber and the floor 4 of the lift-off chamber is in the form of a planar surface and cooperates to form a gap 5 which is bounded at its top by the partition 6. The gap 5 may be designed in the shape of a wedge over its entire length or the gap may have an increasing apertured dimension over its length.

The withdrawal of the high density portion from the lift-off chamber 2 occurs by means of a rotating lift-off arm 8 which at its outer end carries a pair of scoops 7. These scoops are arranged to come in close proximity with the floor 4 of the lift-off chamber, the floor 4 being partially circular in cross section. The distance between the scoop 7 and the floor 4 corresponds to about one-fourth of the fraction size of the product as previously explained. In the region of the partition 6, i.e., at about the shortest vertical distance to the separating gap 5, the shortest distance of the scoop 7 from the floor corresponds about to the fraction size of the product.

Both the settling chamber 2 and the lift-off chamber 3 are provided with intakes 10 (FIG. 1) for the dense liquid medium. The intake 10 in the settling chamber is disposed at a relatively slight distance below the surface level of the liquid medium. The intake 10 in the lift-off chamber 2, by contrast, is disposed in the region of the floor 4 of the lift-off chamber 2. The intake 10 in the settling chamber and in the lift-off chamber 2 are disposed such that the directions of flow of the emerging dense liquid medium are oppositely directed.

The product to be separated into fractions is delivered into the settling chamber 1 by means of a chute 13. The velocity of the dense liquid medium in that area is such that a laminar flow prevails in the settling chamber 1 so that the low density particles are floated over the edge of a weir and a chute 14 into a drum screen 15 where the adherent dense medium is separated off in the first section of the screen. The low density particles are cleaned in the second section of the drum screen 15 by means of circulating wash water. The low density particles are then introduced directly from the drum screen 15 into a collecting vessel 16.

The forces of gravity acting on the high density particles cause such particles to sink to the floor 3 of the settling chamber where the sinking motion is converted into a lateral motion into the lift-off chamber 2 as a result of the sloping wall structure.

The lift-off arm 8 having the scoops 7 thereon is driven by means of an electric drive motor (not shown). The scoops 7 turn in such a direction that they execute an upward motion in the area of the partition 6. The descending heavier particles are thereby picked up before they reach the floor 4 of the lift-off chamber 2. When a scoop 7 has reached its upper position, the high density particles deposited thereon fall into a chute 17 whereupon they are passed into a drum screen 18 to be cleaned and separated from the dense liquid medium. If iron constituents are contained in the high density particles, a magnetic drum may be disposed at the discharge end of the screen 18, the screened product being conveyed therefrom either onto a sorting belt or into a container.

Figure 3:
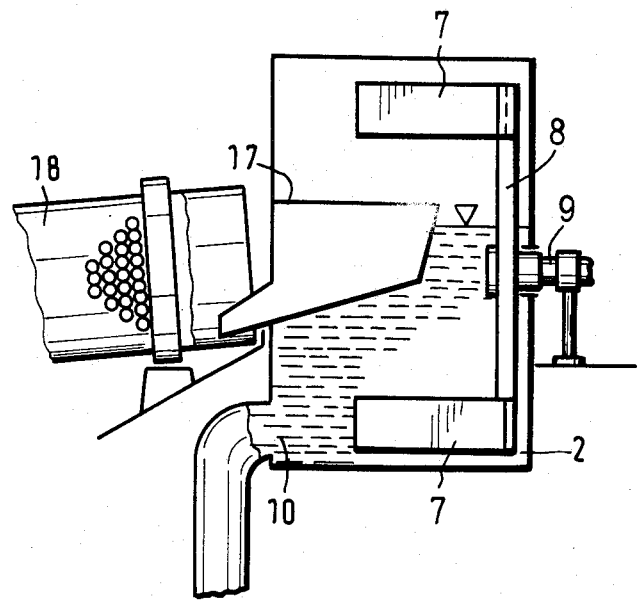
FIG. 3 is a cross-sectional view taken substantially along the line III—III in FIG. 4.

FIG. 3 illustrates a longitudinal section through the settling chamber together with a pumping system therefor. The screen openings of the drum screen 15 and the drum screen 18 are dimensioned such that the smallest portions of the product fall through and are circulated together with the dense liquid medium through the pipeline system and pumps. As a result, the dense medium is agitated constantly in the overall system so that deposits do not form in any part of the apparatus. The screen openings in the following wash section 19 are dimensioned such that the product can no longer fall through.

It will be evident that various modifications can be made to the described embodiments without departing from the scope of the present invention.

I claim as my invention:

1. A separating apparatus for separating a heavy and a light solid fraction from a dispersion in a dense liquid medium comprising:

a receptacle for said dense liquid medium, a partition wall subdividing said receptacle into a settling chamber and a lift-off chamber, said partition wall being formed with a gap at the bottom of said receptacle to provide fluid communication between the aforementioned chambers, said settling chamber having an inlet for the dispersion and having an inclined floor extending downwardly toward said lift-off chamber, a rotary lift-off arm mounted for rotation in said lift-off chamber and having scoops at its ends for lifting sunken particles from said heavy fraction from the floor of said lift-off chamber and out of said apparatus, the axis of rotation of said lift-off arm being parallel with respect to said partition wall, the direction of rotation being such that said scoops move upwardly when approaching said gap from the bottom of said lift-off chamber, said lift-off chamber having an outlet for the heavy fraction and having a floor forming an extension of and merging with said inclined floor of said settling chamber and being at least partially arcuate to accommodate the path of travel of said scoops, a first intake for said dense liquid medium in said lift-off chamber disposed in the area of the floor of said lift-off chamber, a second intake for said dense liquid medium in said settling chamber disposed slightly below the level of said dense liquid medium, overflow means in said settling chamber arranged to discharge light fraction material out of said settling chamber and out of said apparatus, said overflow means being disposed opposite to said second intake, said first intake and said second intake being disposed so as to deliver said dense liquid medium in opposite directions and parallel to said partition wall, said first intake being arranged to produce a laminar flow of dense liquid medium in said settling chamber, and said second intake being arranged to produce a turbulent flow in said lift-off chamber.

2. An apparatus according to claim 1 wherein said fractions are derived from shredded automotive scrap material.

* * * * *